(12) United States Patent
Proietti et al.

(10) Patent No.: US 11,265,627 B1
(45) Date of Patent: Mar. 1, 2022

(54) BANDWIDTH-RECONFIGURABLE OPTICAL INTERCONNECT BASED ON WAVELENGTH AND SPATIAL SWITCHING

(71) Applicant: The Regents of the University of California, Oakland, CA (US)

(72) Inventors: Roberto Proietti, Davis, CA (US); Sung-Joo Ben Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 386 days.

(21) Appl. No.: 16/582,902

(22) Filed: Sep. 25, 2019

Related U.S. Application Data

(60) Provisional application No. 62/737,708, filed on Sep. 27, 2018.

(51) Int. Cl.
*H04Q 11/00* (2006.01)
*H04J 14/02* (2006.01)

(52) U.S. Cl.
CPC ...... *H04Q 11/0005* (2013.01); *H04J 14/0212* (2013.01); *H04Q 11/0066* (2013.01); *H04Q 2011/0032* (2013.01)

(58) Field of Classification Search
CPC ... H04Q 2011/0007; H04Q 2011/0024; H04Q 2011/0032; H04Q 2011/0035
See application file for complete search history.

(56) References Cited

U.S. PATENT DOCUMENTS

| 9,401,774 B1 | 7/2016 | Mineo et al. |
| 2009/0324243 A1* | 12/2009 | Neilson ............... H04Q 11/0005 398/154 |
| 2019/0013863 A1* | 1/2019 | Kurosu ................ H04B 10/077 |

OTHER PUBLICATIONS

Yu et al., "A scalable silicon photonic chip-scale optical switch for high performance computing systems", Optics Express, vol. 21, No. 23, OSA, 2013 (Year: 2013).*

* cited by examiner

*Primary Examiner* — Shi K Li
(74) *Attorney, Agent, or Firm* — Park, Vaughan, Fleming & Dowler LLP

(57) ABSTRACT

The disclosed system implements a bandwidth-reconfigurable optical interconnect, which couples optical signals between N interconnect inputs and N interconnect outputs. The system includes an arrayed waveguide grating router (AWGR), which provides cyclic, single-wavelength, all-to-all routing between N AWGR inputs and N AWGR outputs. The system also includes a wavelength-insensitive switch, which provides all-wavelength, all-to-all connectivity between N wavelength-insensitive inputs and N wavelength-insensitive outputs. The system additionally includes a wavelength-selective input switch, which selectively directs up to L wavelengths from each of the N interconnect inputs into a corresponding input of the wavelength-insensitive switch, wherein unselected wavelengths from each of the N interconnect inputs pass into a corresponding AWGR input. Finally, the system includes a wavelength-selective output switch, which selectively directs up to L wavelengths from each of the N wavelength-insensitive outputs into a corresponding interconnect output, wherein each of the N AWGR outputs pass into a corresponding interconnect output.

21 Claims, 8 Drawing Sheets

|     | $O_0$ | $O_1$ | $O_2$ | $O_3$ |
| --- | --- | --- | --- | --- |
| $I_0$ | - | $\lambda_1$ | $\lambda_0\lambda_2\lambda_3$ | - |
| $I_1$ | - | - | - | $\lambda_0\lambda_1\lambda_2\lambda_3$ |
| $I_2$ | $\lambda_0\lambda_1\lambda_2$ | $\lambda_3$ | - | - |
| $I_3$ | $\lambda_3$ | $\lambda_0\lambda_2$ | $\lambda_1$ | - |

TABLE I

|  | Fat Tree | Fat Tree 2:1 | FlexLIONS |
|---|---|---|---|
| #Switches | 32 | 24 | 16 |
| #Transceivers | 1024 | 640 | 512 |
| Link data rate | 100G | 100G | 100G |
| Bisection BW | 25.6Tb | 12.8Tb | 25.6Tb |

FIG. 7A

TABLE II

|  | FlexLIONS #Ports | | |
|---|---|---|---|
| Component | 16 ports | 32 ports | 64 ports |
| AWGR | 16x16 | 32x32 | 64x64 |
| MEMS | 16x16 | 32x32 | 64x64 |
| #MRs | 2016 | 4032 | 8064 |
| #Wavelengths | 64 | 128 | 256 |

FIG. 7B

BANDWIDTH-RECONFIGURABLE OPTICAL INTERCONNECT BASED ON WAVELENGTH AND SPATIAL SWITCHING

CROSS-REFERENCE TO RELATED APPLICATION

This application claims priority under 35 U.S.C. § 119(e) to U.S. Provisional Application Ser. No. 62/737,708, entitled "Optical Interconnect Architecture with Reconfigurable Topology based on Wavelength and Spatial Switching," by inventors Roberto Proietti and Sung-Joo Ben Yoo, filed on 27 Sep. 2018, the contents of which are hereby incorporated herein by reference.

GOVERNMENT LICENSE RIGHTS

This invention was made with U.S. government support under grant number H98230-16-C-0820 awarded by the Department of Defense and the National Security Agency, and under grant number 1611560 awarded by the National Science Foundation. The U.S. government has certain rights in the invention.

BACKGROUND

Field

The disclosed embodiments generally relate to the design of optical interconnection networks. More specifically, the disclosed embodiments relate to the design of a bandwidth-reconfigurable optical interconnect architecture, which utilizes both wavelength switching and spatial switching.

High-performance computing (HPC) systems are continuing to grow in size to keep pace with dramatic increases in computing workloads, and to provide higher performance and energy efficiency. Exploiting parallelism has become key to attaining these goals due to the end of Moore's Law and Dennard scaling, giving rise to larger numbers of processors within computing nodes ("scale-in"), as well as larger numbers of total computing nodes ("scale-out") in HPC systems. These phenomena are placing increasing demands on interconnection networks at all levels of an HPC system's hierarchy (i.e., in on-board networks between processors within a node, intra-rack networks between nodes inside a rack, and inter-rack networks between racks) and have already had a significant impact on performance, power consumption, and system cost. In fact, it is questionable whether the performance gains of parallel systems can further be exploited without significant improvements in associated interconnection networks. Hence, making efficient use of network bandwidth is becoming one of the most-critical attributes as the available network bandwidth directly affects system cost and power consumption (either through a higher number of interconnects in a network topology or higher data rate transceivers).

In addition, communication patterns between computing nodes in HPC workloads are typically not evenly distributed, and traffic between certain network nodes (or even within the entire network) can vary significantly between low-utilization computing-intense and high-utilization communication-intense phases. (For example, see P. Gratz and S. W. Keckler, "Realistic workload characterization and analysis for networks-on-chip design," in *The 4th workshop on chip multiprocessor memory systems and interconnects (CMP-MSI)*, 2010, pp. 1-10.) Because of this uneven traffic distribution, simultaneously providing enough network bandwidth for high-utilization phases between certain sender-receiver pairs without wasting energy in low-utilization phases is a considerable challenge. Dynamic voltage and frequency scaling of transceivers partially solves this problem from a power perspective because it facilitates adapting a link's data rate to a current workload. However, power penalties limit the maximum data rate of transceivers, and the resources required to have these links in the network topology in the first place (e.g., higher-port routers, transceivers, and fibers) can incur significant costs.

Another challenge is to provide low (zero-load) network latency, particularly as network size increases. For instance, in inter-rack communication, latency can become a significant factor in system performance because networks are typically structured as multi-hop fat trees (for load-balancing purposes) with switch traversal latencies of 100s of nanoseconds. System performance can be significantly improved if fewer hops or even single-hop all-to-all connectivity is a possibility. In addition, all-to-all networks can reduce routing overheads (e.g., packet sizes and buffers) and the number of switches, thereby enabling lower power and lower cost solutions.

Hence, what is needed is a high-bandwidth, low-latency interconnection network that efficiently handles uneven traffic distributions, and which can be implemented at low cost and with low power consumption.

SUMMARY

The disclosed embodiments provide a system that implements a bandwidth-reconfigurable optical interconnect, which couples optical signals between N interconnect inputs and N interconnect outputs. The system includes an arrayed waveguide grating router (AWGR), which provides cyclic, single-wavelength, all-to-all routing between N AWGR inputs and N AWGR outputs using N wavelengths. The system also includes a wavelength-insensitive switch, which provides wavelength-insensitive connectivity between N wavelength-insensitive inputs and N wavelength-insensitive outputs. The system additionally includes a wavelength-selective input switch, which selectively directs up to L wavelengths from each of the N interconnect inputs into a corresponding input of the wavelength-insensitive switch, wherein unselected wavelengths from each of the N interconnect inputs pass into a corresponding AWGR input. Finally, the system includes a wavelength-selective output switch, which selectively directs up to L wavelengths from each of the N wavelength-insensitive outputs into a corresponding interconnect output, wherein each of the N AWGR outputs pass into a corresponding interconnect output.

In some embodiments, the wavelength-insensitive switch comprises a micro-electro-mechanical system (MEMS)-based crossbar switch.

In some embodiments, the wavelength-insensitive switch comprises a Mach-Zehnder interferometer (MZI)-based crossbar switch.

In some embodiments, the wavelength-insensitive switch comprises a microring-resonator (MR)-based crossbar switch.

In some embodiments, the wavelength-selective input switch and the wavelength-selective output switch are implemented using MR filters.

In some embodiments, each MR filter in the wavelength-selective input and output switches includes an integrated heater that can selectively turn the MR on or off by changing a temperature of the MR so that a resonance wavelength of the MR shifts beyond a free spectral range of all wavelengths in an associated link.

In some embodiments, the parameter L of the wavelength-selective input switch and the wavelength-selective output switch can be as large as N.

In some embodiments, the system also includes a set of event-driven, energy-efficient, high-speed transceivers (TRXs) with dynamic voltage and frequency scaling (DVFS) coupled to endpoints of the bandwidth-reconfigurable optical interconnect.

In some embodiments, the bandwidth-reconfigurable optical interconnect is a member of a set of bandwidth-reconfigurable optical interconnects, which are hierarchically connected in a tree topology to create a Hierarchical Flexible Low-latency Interconnect Optical Network (Hi-Flex-LION) switch.

In some embodiments, the bandwidth-reconfigurable optical interconnect is a member of a set of bandwidth-reconfigurable optical interconnects, which are connected in a Thin-Clos topology to create a Thin-Clos Flex-LION switch.

BRIEF DESCRIPTION OF THE FIGURES

FIG. 7A presents Table I, which illustrates resource requirements for network topologies under investigation in accordance with the disclosed embodiments.

FIG. 7B presents Table II, which illustrates resource requirements for scaling to higher port counts in accordance with the disclosed embodiments.

DETAILED DESCRIPTION

Figure 1:
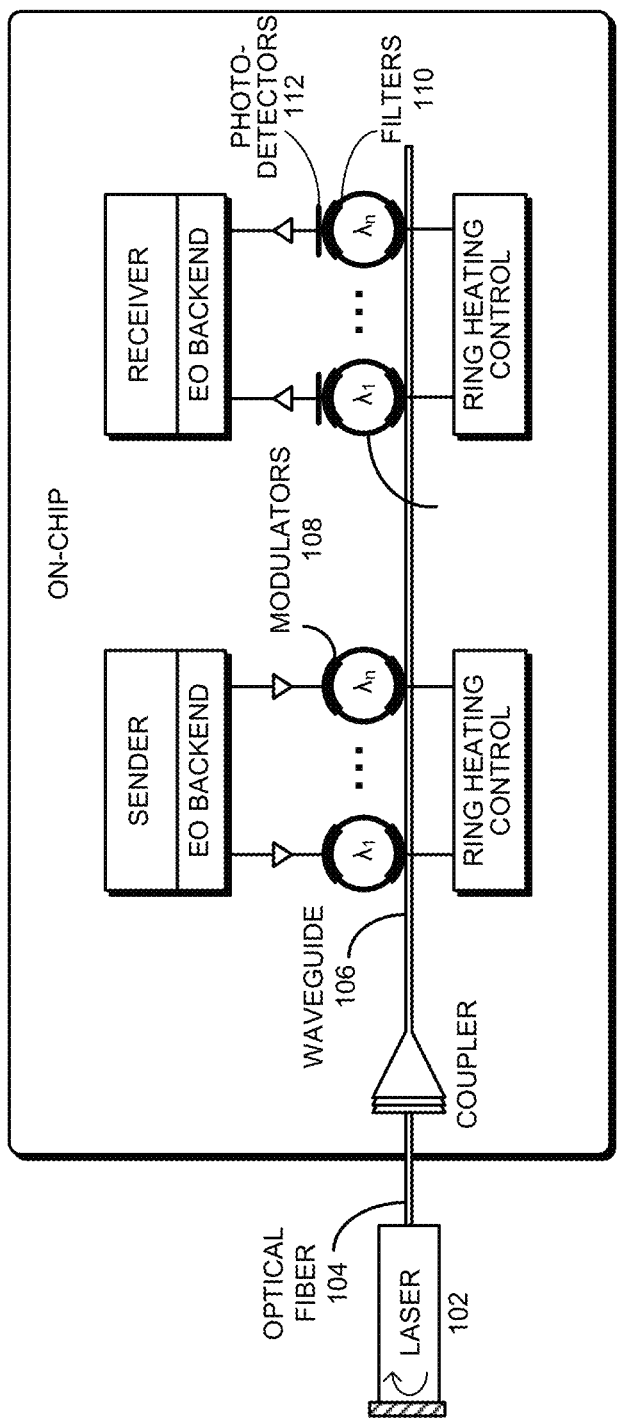
FIG. 1 illustrates an exemplary silicon photonic link.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a bandwidth-reconfigurable all-to-all switching fabric called "FlexLIONS," which combines different silicon-photonic (SiP) components for high energy efficiency. FlexLIONS provides a diameter-one all-to-all switching fabric that facilitates minimal zero-load latency and allows each sender to allocate each available wavelength to any output link in the network. Moreover, the FlexLIONS architecture provides arbitrary network reconfiguration and bandwidth allocation among all connected nodes, thereby providing each sender with the flexibility to allocate all available wavelengths to its output links based on traffic demands.

FlexLIONS integrates an arrayed waveguide grating router (AWGR), a wavelength-insensitive switch, and microring resonators to construct a highly flexible switch fabric that achieves a near-optimal bandwidth while using fewer network resources (i.e., switches and transceivers) as compared to state-of-the-art networks. Moreover, FlexLIONS can be fabricated on a 12 mm×13 mm interposer, and can be reconfigured in less than 10 µs, making it suitable for other interconnection networks, such as on-board networks between processors and memories.

Enabling Silicon-Photonic Technologies

Silicon-photonic technologies provide a variety of interesting devices that have the potential to provide tremendous power and performance benefits for HPC networks. Our FlexLIONS system can be implemented by integrating three such SiP devices, including: (1) microring resonators (MRs), (2) AWGRs, and (3) micro-electro-mechanical systems (MEMS) switches, which are described in more detail below.

Microring Resonators

To understand the significance of MRs to SiP interconnects, it is useful to first consider how data transmission is performed in an optical link. FIG. 1 depicts an exemplary optical link, which includes components for transmitting data between a source and a destination. As illustrated in FIG. 1, light generated by an off-chip laser 102 is confined inside an optical fiber 104, which is coupled to an on-chip waveguide 106. During operation, modulators 108 encode bits onto the optical medium thereby performing electrical-to-optical (EO) conversion, and filter-photodetector pairs 110 and 112 extract the optical signal, thereby performing optical-to-electrical (OE) conversion. Aside from steering particular wavelengths to a photodetector, MR filters are also used as switching devices, because they allow us to 'drop' wavelengths from one waveguide to another, thereby enabling wavelength-selective routing by strategically placing them between waveguides. The optical signals can include multiple wavelengths ($\lambda_0, \ldots, \lambda_n$) on which data can be transmitted in parallel—a technique commonly referred to as "wavelength division multiplexing" (WDM). In order to exploit WDM, one modulator and MR filter per wavelength is needed at the sender and receiver, respectively.

MRs form the basis for both modulators and filters and are designed to respond to one particular wavelength channel, which is referred to as a "resonance wavelength." However, MRs are cyclic with a period called the "free spectral range" (FSR), which means that an MR that drops wavelength $\lambda_i$ can also drop wavelength $\lambda_{i+FSR*k}$ (with k being an integer). Note that an MR's resonance wavelength depends on device geometry/dimensions, and ambient temperature variations can cause the resonance wavelength to shift, which can cause a malfunction. While device mismatches during fabrication can be mitigated by MR trimming, protecting MRs from on-chip temperature variations requires integrated heaters to ensure thermo-optical control of each individual MR during operation.

Aside from ensuring correct behavior, the integrated heaters can also be deliberately used to dynamically turn off and on MR filters. Note that changing the ambient temperature of a MR with heaters so that its resonance wavelength shifts beyond the free spectral range of all wavelengths on a link effectively enables one to dynamically turn off and on a MR. This approach has been used to implement path setup and tear down functionality for circuit-switched optical networks based on wavelength-selective routing, and is also used in our proposed switching fabric.

Arrayed Waveguide Grating Router

While the wavelength routing functionality in an optical network can be implemented with MRs (as discussed above), networks that rely solely on MRs to perform routing have shortcomings, such as large power overheads for thermo-optical control of each MR, poor scalability (networks often require 1000s of MRs, as the number of MRs scales quadratically with the router port count), excessive crosstalk, and the challenging task of finding a physical layout with low path losses.

AWGRs overcome these challenges by providing scalable and low-loss wavelength routing on a passive platform that uses phase changes and constructive interference to enable an all-to-all N×N interconnection utilizing N wavelengths and N input and output waveguides. Unlike MRs, AWGRs are less susceptible to temperature variations, and generally do not require on-chip heating. In addition, recent advancements in CMOS-compatible SiN-based AWGRs provide significant reductions in footprint (<1 mm$^2$), crosstalk (<−38 dB), and loss (<2 dB), thereby providing a considerable edge over MR-based switching fabrics.

Figure 2A:
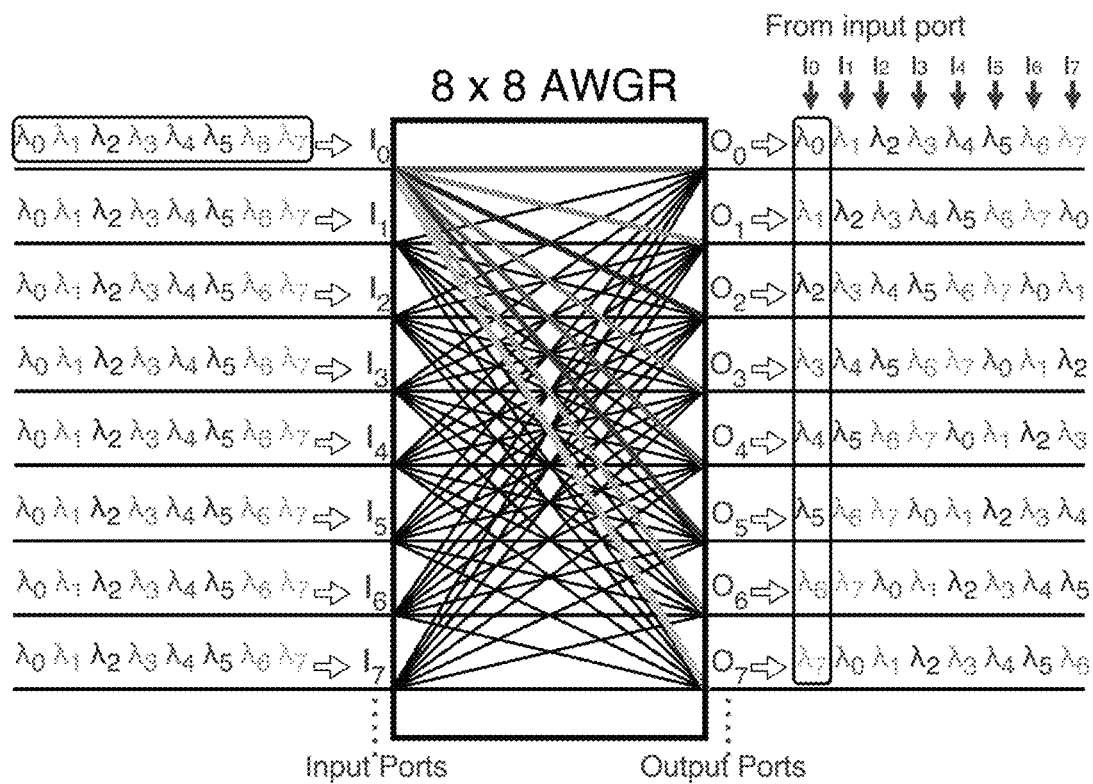
FIG. 2A illustrates wavelength distribution inside an AWGR.

FIG. 2A illustrates the wavelength distribution from the input to the output ports inside an 8×8 AWGR. Note that the wavelengths from each input port are evenly distributed to all output ports. This switching functionality is enabled by the constant phase change that each signal experiences when traversing the grating waveguides of an AWGR (see FIG. 2B) and is caused by the constant length increment of the grating waveguides. After traversing the grating waveguides, the wavelengths interfere constructively in the free space propagation region and get refocused at the output ports depending on their experienced phase shift.

It is important to note that, just like MRs, AWGRs are also cyclic with the period. Therefore, if port i can reach port j with wavelength $\lambda_{ij}$, port i can also reach port j with wavelength $\kappa_{ij+FSR*k}$ (with k being an integer). This property has been exploited to transmit multi-wavelength signals between source-destination pairs through an AWGR, and is referred to as a "bit-parallel AWGR."

Wavelength-Insensitive Switches

A wavelength-insensitive (or "colorblind") switch can be implemented using a MEMS-based crossbar switch fabric that provides fast switching times, thereby enabling rapid bandwidth reconfiguration. Recently proposed MEMS switches are particularly promising because they provide low switching times (0.85 µs), low on-chip insertion loss (8.5 dB), low footprint (1.9 mm×1.9 mm for a 16×16 MEMS), and, unlike MR-based fabrics, consume negligible on-chip power. (See T. J. Seok, et al., "Highly scalable digital silicon photonic MEMS switches," Journal of Lightwave Technology, vol. 34, no. 2, pp. 365-371, 2016.)

A MEMS-based crossbar switch fabric comprises two layers of waveguides and uses MEMS-actuated vertical adiabatic couplers as switching elements. The optical operation bandwidth of adiabatic couplers ranges from 1400 nm to 1700 nm, which is fully compatible with WDM networks. WDM signals entering an input port therefore either transit to the "through ports" if all switching elements are in an off state, or are switched to one "drop port" if a corresponding switching element is in an on state.

This structure allows each input port to reach every output port as long as the switching elements are configured accordingly. However, MEMS switches are wavelength-insensitive (colorblind) switches, and thus always switch all wavelengths of a WDM to a certain output port. Variable bandwidth allocation is therefore not possible, and each input can communicate only with one output at a time, which means that simultaneous all-to-all connectivity as in AWGRs cannot be supported.

In the following section, we show how MRs, AWGRs, and MEMS switches can be combined to form a powerful, highly efficient, bandwidth-adaptive all-to-all interconnection fabric by exploiting the benefits of each constituent device.

FlexLIONS

Target Switching Fabric

The goal of our proposed FlexLIONS architecture is to provide an all-to-all interconnection switch fabric in which each sender can dynamically allocate bandwidth to each of its output links based on an application's communication demands.

Figure 2B:
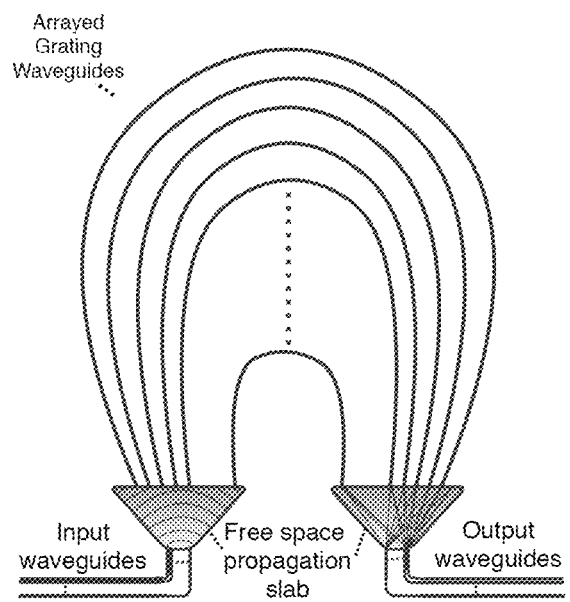
FIG. 2B illustrates a schematic of an AWGR.
Figure 3C:
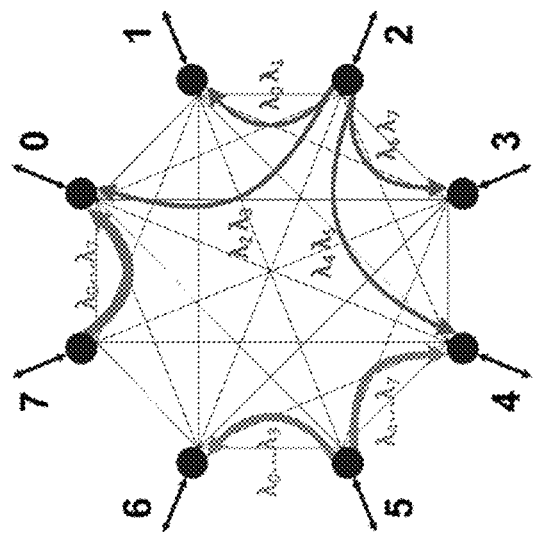
FIG. 3C illustrates an all-to-all network with flexible bandwidth reconfiguration in accordance with the disclosed embodiments.
Figure 3B:
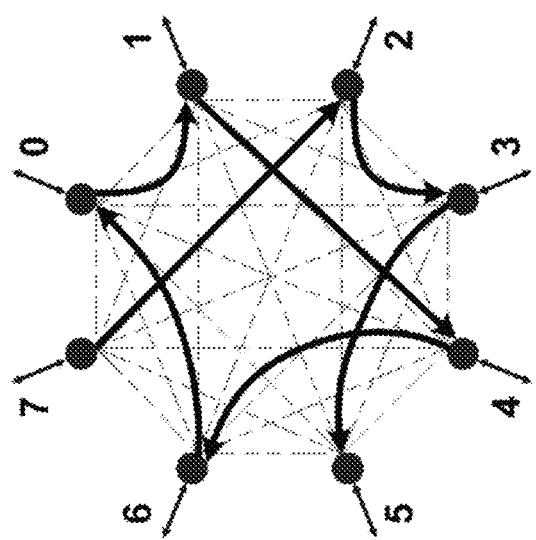
FIG. 3B illustrates a circuit-switched crossbar switch.
Figure 3A:
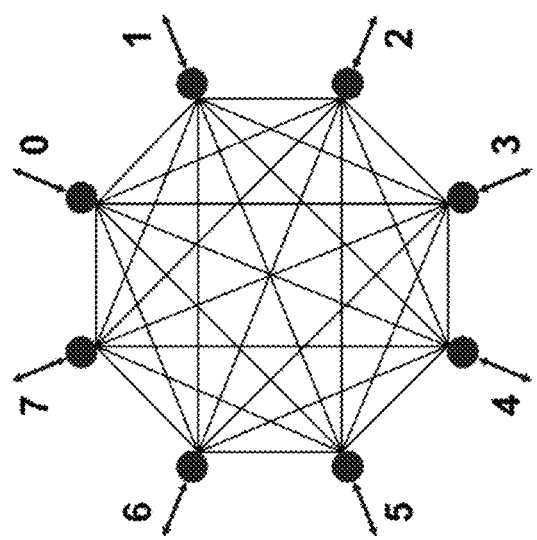
FIG. 3A illustrates an all-to-all network with uniform link bandwidth and no reconfiguration.

In an all-to-all network without configuration capability (as shown in FIG. 3A), each input port communicates with each output port with the same link bandwidth. For example, a standard AWGR illustrated in FIG. 2B provides such a switch fabric. Although all-to-all networks have the advantage of being diameter-one topologies (and, in turn, offer minimal zero-load latency), the bandwidth utilization in such networks is typically poor, leading to much of the network bandwidth and power being wasted on barely utilized links.

Senders can ideally configure the bandwidth on the links to each destination adaptively based on the traffic demands of an application. One approach often used in optical transceivers is dynamic voltage and frequency scaling (DVFS), which allows the system to dynamically change the link data rate. However, power and technology constraints place an upper limit on the per-wavelength data rate of an optical link, thus limiting the magnitude of this approach. In addition, individual physical links are needed to provide connectivity to each node. This limitation can be overcome by exploiting WDM and wavelength-selective routing in SiP (instead of using independent, all-to-all physical links between each sender-receiver pair). By leveraging this approach, each sender can have a pool of wavelengths available for data communication provided from a multi-wavelength laser and can allocate wavelengths to destinations based on the communication demands during an application. This allocation can be done by reconfiguring the optical network fabric, for example, by configuring which wavelengths are routed to which destinations, prior to executing a workload. Previous approaches exploited wavelength routing by either using MEMS or broadband ring resonators to reconfigure the network. However, both of these approaches are based on broadband, wavelength-insensitive (colorblind) SiP switching elements, and can only route all wavelengths from one node to another—effectively executing a circuit-switching mechanism, which allows only point-to-point communication while all remaining connections are disconnected. This configuration is illustrated in FIG. 3B.

Although these previous approaches are useful in some scenarios (e.g., assigning all of the bandwidth to one destination to support large "elephant" data flows in data centers), in the vast majority of cases, traffic is more distributed and irregular in nature where one would still like to maintain connectivity to other nodes. In fact, superior performance metrics can be achieved if bandwidth reconfiguration is more flexible and can support any sender-receiver and wavelength assignment. For instance, if a node A sends 90% of its traffic to node B and 10% to node C (while other nodes are not communicated with) and has a pool of 10 wavelengths available, to maximize performance it would ideally allocate nine wavelengths to node B and one wavelength to node C. This can be enabled by reconfiguring the interconnection fabric to route nine wavelengths from node A to node B and one wavelength to node C. This approach reduces the number of utilized fibers, and can keep all nodes that are communicating with each other connected at all times. Hence, it provides a higher degree of freedom for reconfiguring bandwidth compared to DVFS, and can even be used in combination with DVFS to provide further variability. An exemplary reconfigured network is shown in FIG. 3C, wherein multiple links have different numbers of wavelengths (and thus bandwidth) available for communication. FlexLIONS provides such a switching fabric and is described in more detail below.

FlexLIONS: Structure and Components

In an exemplary implementation, ASIC switches are connected to a FlexLIONS system and use it as the communication fabric. In this implementation, each ASIC switch is integrated on the same package as SiP transceivers, wherein both are placed and interconnected through an active SiP interposer, yielding tight integration and high energy efficiency. Optical fibers connected to the SiP transceivers from each ASIC switch are coupled in and out of the die containing the FlexLIONS fabric, which enables all-to-all communication among all connected switches. This implementation places both the switch ASICs and FlexLIONS on the same board. However, because communication is optical and thus virtually distance-independent (in terms of latency and energy), system designers have significant freedom in placing the switches, and are not restricted to mounting them on the same board.

The FlexLIONS die contains the switching fabric that enables full connectivity between each input port and output port and allows for maximum flexibility in bandwidth assignment. The AWGR provides all-to-all connectivity, while the MRs and MEMS switching elements are utilized for the bandwidth reconfiguration. An efficient and suitable approach for integrating all of these components within the same package is to use an active optical interposer. One embodiment of FlexLIONS can easily fit on a 156 mm$^2$ (12 mm×13 mm) interposer, a size that is readily available. We next describe the bandwidth reconfiguration mechanism in FlexLIONS.

Reconfiguration Mechanism

Figure 4A:
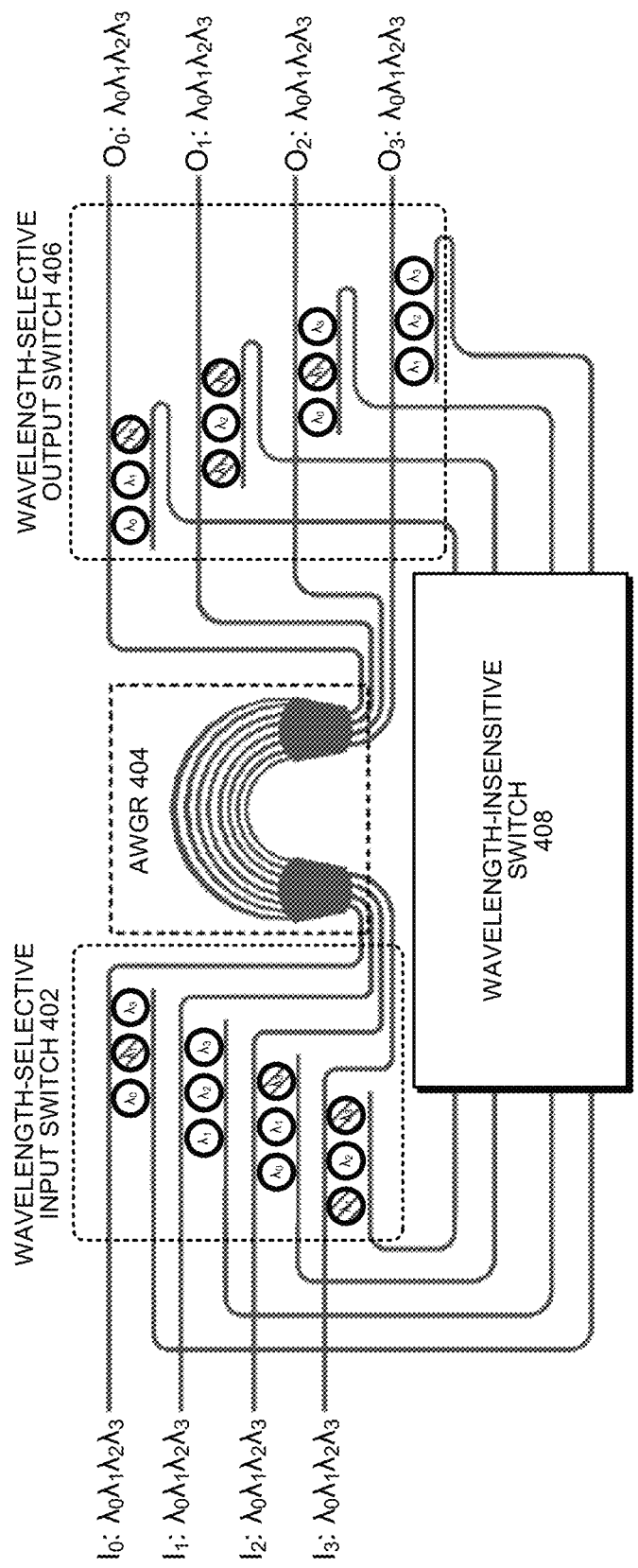
FIG. 4A illustrates an exemplary flexible low-latency interconnect optical interconnect network (FlexLION) switch in accordance with the disclosed embodiments.

FIG. 4A illustrates an exemplary configuration of FlexLIONS for a four-node design. In this configuration, a wavelength-selective input switch 402 selectively directs up to three wavelengths from each of the interconnect inputs $I_0$, $I_1$, $I_2$ and $I_3$ into a corresponding input of a wavelength-insensitive switch 408, wherein unselected wavelengths from each of the interconnect inputs pass into a corresponding input of AWGR 404. A wavelength-selective output switch 406 selectively directs up to three wavelengths from each of the outputs of wavelength-insensitive switch 408 into a corresponding interconnect output, $O_0$, $O_1$, $O_2$ or $O_3$. Moreover, each output of AWGR 404 passes into a corresponding interconnect output, $O_0$, $O_1$, $O_2$ or $O_3$.

Figures 4B, 4C:
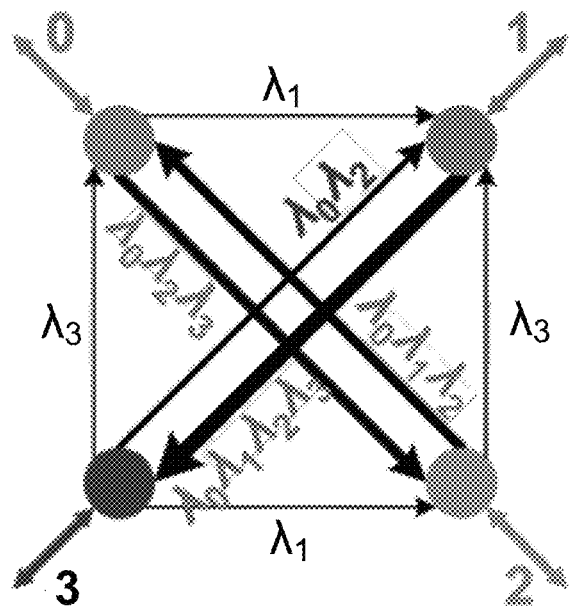
FIG. 4B illustrates a logical topology for the exemplary FlexLION switch illustrated in FIG. 4A in accordance with the disclosed embodiments.
FIG. 4C illustrates a connectivity matrix for the exemplary FlexLION switch illustrated in FIG. 4A in accordance with the disclosed embodiments.

The associated bandwidth configuration for this FlexLIONS system is illustrated in both a logical topology in FIG. 4B and in a connectivity matrix in FIG. 4C. In all cases, the MRs at the input and output waveguides, as well as the switching elements in the MEMS, must be turned either ON or OFF, depending on what wavelength a sender wants to communicate to its receiver. Essentially, there are three different base configuration cases.

In the first case, a sender wants to evenly distribute its traffic (and thus the wavelengths/bandwidth) to all receivers. In this case, all MRs at the input waveguides are turned OFF so that all wavelengths of the incoming WDM signal route through the AWGR, which evenly distributes the wavelengths to each output port.

In the second case, a sender wants to send all its traffic to the same receiver, and thus requires full bandwidth to that receiver. In this case, all MRs at the input waveguides must be turned ON so they will guide (drop) the wavelengths to the MEMS. Also, the adiabatic couplers in the MEMS, which are responsible for steering wavelengths to the output port corresponding to the receiver, must be turned ON. (Note that the switching elements inside the MEMS are colorblind and thus always drop all wavelengths.) Subsequently, the MRs at the output waveguides must be turned ON to add the wavelength to the desired output port. This is illustrated in FIG. 4A from input $I_1$ to output $O_1$.

In the third case, a sender has different traffic demands for different receivers (see FIG. 4C $I_0 \rightarrow O_1/O_2$, $I_2 \rightarrow O_0/O_1$, $I_3 \rightarrow O_0/O_1/O_2$). There are two possibilities for this case. (1) The AWGR routes a wavelength to the desired output port, in which case the MR at the input waveguide must be turned OFF to allow the signal to go through the AWGR. Otherwise, (2) the MRs at the input waveguides corresponding to the wavelengths destined to the output waveguide must be turned ON in combination with the correct switching elements of the MEMS and the MRs at the output waveguides.

Note that a reconfigurable switching fabric like FlexLIONS has one input link/fiber and one output link/fiber to each node in the network. Given that each node has only one input port, the wavelength assignment and reconfiguration must occur so that no two senders send to the same receiver on the same wavelengths to avoid destructive interference (i.e., two signals on the same wavelength arrive at a receiver simultaneously). Therefore, although such a switching fabric provides all-to-all connectivity, it does not provide a strict point-to-point, contention-less topology. This means a reconfiguration mechanism must take into account all senders, receivers, and bandwidth demands to assign wavelengths to senders while preventing destructive interference.

Utilization in HPC Center Network

We now analyze the impact FlexLIONS has on inter-rack networks. The vast majority of high-performance data center networks are tree-based topologies, most prominently fat tree or Clos topologies, because they provide good scalability and load-balancing properties. Note that "oversubscription" is a commonly used technique in tree-based networks to conserve resources and power, and to adapt to current network utilization. In a system that uses oversubscription, the next tree stage only has a fraction of the output links/bandwidth of the previous stage.

Figure 5C:
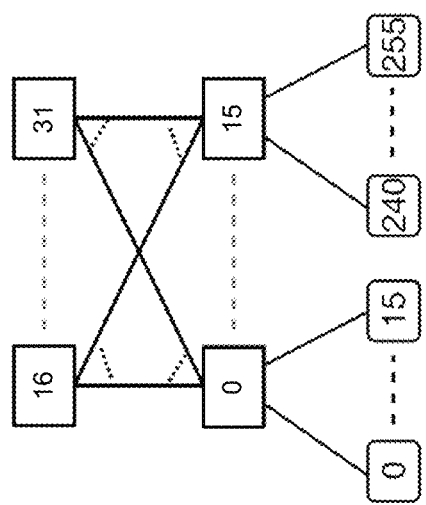
FIG. 5C illustrates an exemplary FlexLIONS network topology in accordance with the disclosed embodiments.
Figure 5B:
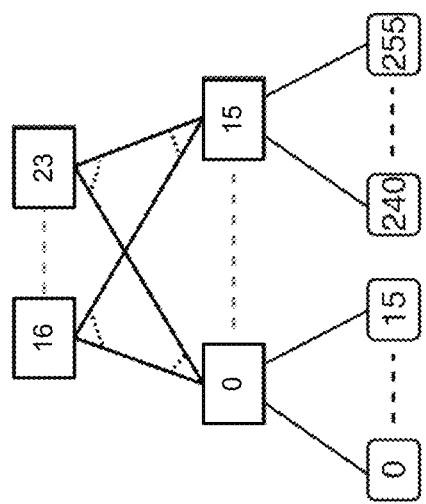
FIG. 5B illustrates an exemplary fat tree network topology with oversubscription of two (2:1) in accordance with the disclosed embodiments.
Figure 5A:
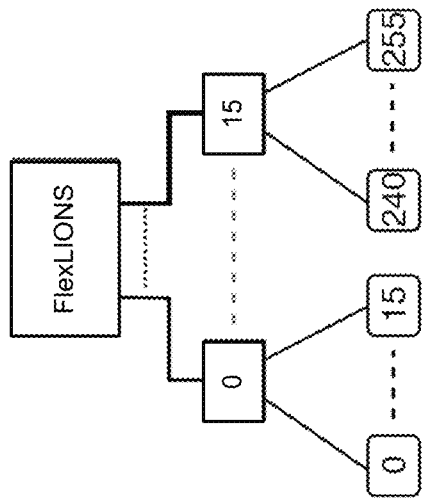
FIG. 5A illustrates an exemplary fat tree network topology.

FIGS. 5A-5C illustrate exemplary topologies supporting 256 nodes that compare an HPC center network with FlexLIONS to legacy fat-tree-based topologies. In particular, FIG. 5A depicts a two-layer "fat tree" that operates without oversubscription, and comprises 32 32-port switches and 640 transceivers. FIG. 5B shows the same network, but with an oversubscription of one ('Fat Tree 2:1'). This means the number of switches on the second layer, and thus the number of outgoing links on the first layer, is half that of a full fat tree. FIG. 5C shows a 256-node HPC network with FlexLIONS, which requires 16 32-port switches, 512 transceivers, and the FlexLIONS switching fabric. Note that classic fat trees in HPC networks typically consist of three layers (edge, aggregate, and core switches). However, for our 256-node example we hypothesize that a two-layer fat tree suffices to satisfy the bandwidth demands and provides more competitive zero-load latency compared to a one-layer FlexLIONS-based network. (Note that for 256 nodes, we simply do not need three layers—typical fat tree network have three layers because given the number of nodes to be connected and the radix of commodity switches, two layers are not enough.) A comparison of the properties of these three networks appears in Table I of FIG. 7A.

One major benefit of FlexLIONS is that its reconfiguration capability can make efficient use of available bandwidth, and might thus provide satisfactory performance metrics without requiring a multi-stage network for load-balancing. In HPC center networks, the latency imposed by additional hops through switches can have a significant impact on system performance. The most competitive switch design in terms of latency currently available is Intel's Omni-Path™ ASIC switch, which requires 100 ns for switch traversal. With this switch-traversal time, the FlexLIONS network can reduce zero-load latency from 300 ns to 200 ns as compared with a two-stage tree. This reduction is significant, especially in low-utilization phases where bandwidth is not stressed. Moreover, FlexLIONS reduces the total number of required switches and transceivers, while providing a similar bisection bandwidth.

Design Considerations and Scalability

The preceding examples of a FlexLIONS system are based on four wavelengths per input port (one for each output port). The comparison of these examples that appears in Table I is based on 100 Gb/s per link, which is a common data rate for state-of-the-art HPC interconnects. Because data rates associated with a 25 Gb/s modulation rate offer the highest energy efficiency, FlexLIONS should ideally be able to support multiple wavelengths (in this example, four) at each receiver to provide 100 Gb/s communication on each link. In order to support a bit-level parallelism of four, we exploit the cyclic dependence of MRs' resonant wavelengths and AWGRs, and provide each sender with the wavelengths: $\lambda_0, \lambda_{0+FSR}, \lambda_{0+2*FSR}, \lambda_{0+3*FSR}, \ldots, \lambda_n, \lambda_{n+FSR}, \lambda_{n+2*FSR}, \lambda_{n+3*FSR}$. Hence, for a 16-port FlexLIONS, each input port needs 16×4=64 wavelengths.

The network illustrated in FIG. 5C requires a 16-port FlexLIONS switching fabric and in turn a 16×16-port AWGR and MEMS—both of which have been demonstrated and do not exhibit scalability problems for this port count. In fact, SiN AWGRs used in FlexLIONS can scale up to 64 ports before crosstalk penalties become an issue. MEMS switches have also been demonstrated to scale up to 64 ports without issues (albeit with an increased, but still acceptable, area footprint of 7 mm×7 mm).

In order to provide full reconfiguration capability, each input port requires one MR for each wavelength except one (because one wavelength will always be routed to a desired output port through the AWGR). That means, for 64 wavelengths per input/output port, this would require 63×2=126 MRs per input/output, and 16×126=2016 MRs. Alternatively, it is also possible to reduce the number of wavelengths that a sender can reconfigure, thereby reducing the number of MRs needed. For example, if a node can only reconfigure half the number of total wavelengths, 16×31×2=992 MRs. If only a quarter of the number of total wavelengths can be reconfigured, only 480 MRs are needed. However, physically implementing 2016 MRs (for full reconfigurability of each wavelength) in a SiP process should not pose any issues in terms of area or energy. The scalability of FlexLIONS and all its components discussed above is summarized in Table II for up to 64 ports. Table II is presented in FIG. 7B.

Method of Operation

Figure 6:
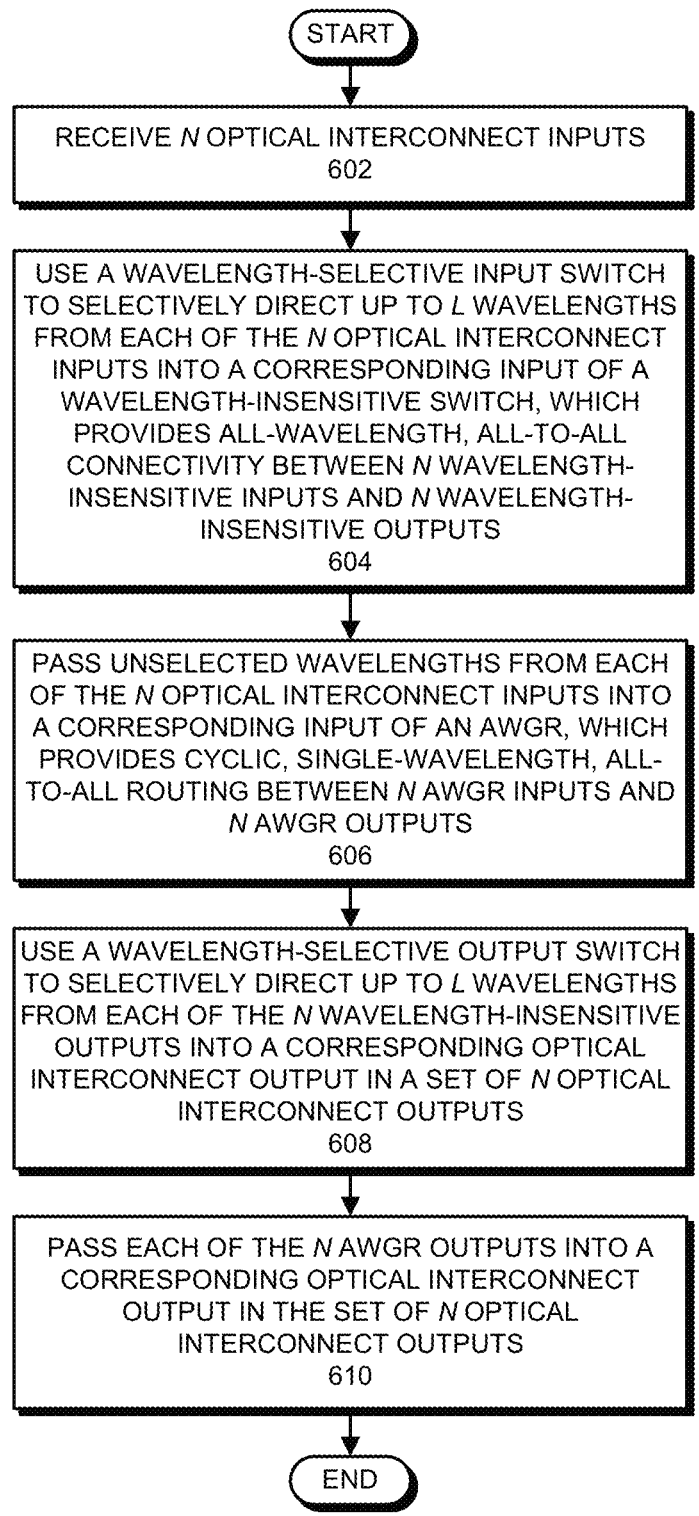
FIG. 6 presents a flow chart illustrating operation of the bandwidth-reconfigurable optical switch in accordance with the disclosed embodiments.

FIG. 6 presents a flow chart illustrating operation of the bandwidth reconfigurable optical switch in accordance with the disclosed embodiments. First, the system receives N optical interconnect inputs (step 602). Next, the system uses a wavelength-selective input switch to selectively direct up to L wavelengths from each of the N optical interconnect inputs into a corresponding input of a wavelength-insensitive switch, which provides all-wavelength, all-to-all connectivity between N wavelength-insensitive inputs and N wavelength-insensitive outputs (step 604). The system also passes unselected wavelengths from each of the N optical interconnect inputs into a corresponding input of an AWGR, which provides cyclic, single-wavelength, all-to-all routing between N AWGR inputs and N AWGR outputs (step 606). Next, the system uses a wavelength-selective output switch to selectively direct up to L wavelengths from each of the N wavelength-insensitive outputs into a corresponding optical interconnect output in a set of N optical interconnect outputs (step 608). The system also passes each of the N AWGR outputs into a corresponding optical interconnect output in the set of N optical interconnect outputs (step 610).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A bandwidth-reconfigurable optical interconnect, comprising:
   N interconnect inputs;
   N interconnect outputs;
   an arrayed waveguide grating router (AWGR), which provides cyclic, single-wavelength, all-to-all routing between N AWGR inputs and N AWGR outputs;
   a wavelength-insensitive switch, which provides all-wavelength, all-to-all connectivity between N wavelength-insensitive inputs and N wavelength-insensitive outputs;
   a wavelength-selective input switch, which selectively directs up to L wavelengths from each of the N interconnect inputs into a corresponding input of the wavelength-insensitive switch;
   wherein unselected wavelengths from each of the N interconnect inputs pass into a corresponding AWGR input; and
   a wavelength-selective output switch, which selectively directs up to L wavelengths from each of the N wavelength-insensitive outputs into a corresponding interconnect output;
   wherein each of the N AWGR outputs pass into a corresponding interconnect output.

2. The bandwidth-reconfigurable optical interconnect of claim 1, wherein the wavelength-insensitive switch comprises a micro-electro-mechanical system (MEMS)-based crossbar switch.

3. The bandwidth-reconfigurable optical interconnect of claim 1, wherein the wavelength-insensitive switch comprises a Mach-Zehnder interferometer (MZI)-based crossbar switch.

4. The bandwidth-reconfigurable optical interconnect of claim 1, wherein the wavelength-insensitive switch comprises a microring-resonator (MR)-based crossbar switch.

5. The bandwidth-reconfigurable optical interconnect of claim 1, wherein the wavelength-selective input switch and the wavelength-selective output switch are implemented using MR filters.

6. The bandwidth-reconfigurable optical interconnect of claim 5, wherein each MR filter in the wavelength-selective input and output switches includes an integrated heater that can selectively turn the MR on or off by changing a temperature of the MR so that a resonance wavelength of the MR shifts beyond a free spectral range of all wavelengths in an associated link.

7. The bandwidth-reconfigurable optical interconnect of claim 1, wherein the parameter L of the wavelength-selective input switch and the wavelength-selective output switch can be as large as N.

8. The bandwidth-reconfigurable optical interconnect of claim 1, further comprising a set of event-driven, energy-efficient, high-speed transceivers (TRXs) with dynamic voltage and frequency scaling (DVFS) coupled to endpoints of the bandwidth-reconfigurable optical interconnect.

9. The bandwidth-reconfigurable optical interconnect of claim 1, wherein the bandwidth-reconfigurable optical interconnect is a member of a set of bandwidth-reconfigurable optical interconnects, which are hierarchically connected in a tree topology to create a Hierarchical Flexible Low-latency Interconnect Optical Network (Hi-Flex-LION) switch.

10. The bandwidth-reconfigurable optical interconnect of claim 1, wherein the bandwidth-reconfigurable optical interconnect is a member of a set of bandwidth-reconfigurable optical interconnects, which are connected in a Thin-Clos topology to create a Thin-Clos Flex-LION switch.

11. A computing system, comprising:
    a set of computing nodes; and
    a bandwidth-reconfigurable optical interconnect, which facilitates communication among the set of computing nodes, wherein the bandwidth-reconfigurable optical interconnect comprises,
    N interconnect inputs,
    N interconnect outputs,
    an arrayed waveguide grating router (AWGR), which provides cyclic, single-wavelength, all-to-all routing between N AWGR inputs and N AWGR outputs,
    a wavelength-insensitive switch, which provides all-wavelength, all-to-all connectivity between N wavelength-insensitive inputs and N wavelength-insensitive outputs,
    a wavelength-selective input switch, which selectively directs up to L wavelengths from each of the N interconnect inputs into a corresponding input of the wavelength-insensitive switch;
    wherein unselected wavelengths from each of the N interconnect inputs pass into a corresponding AWGR input, and
    a wavelength-selective output switch, which selectively directs up to L wavelengths from each of the N wavelength-insensitive outputs into a corresponding interconnect output;
    wherein each of the N AWGR outputs pass into a corresponding interconnect output.

12. The computing system of claim 11, wherein the wavelength-insensitive switch comprises a micro-electro-mechanical system (MEMS)-based crossbar switch.

13. The computing system of claim 11, wherein the wavelength-insensitive switch comprises a Mach-Zehnder interferometer (MZI)-based crossbar switch.

14. The computing system of claim 11, wherein the wavelength-insensitive switch comprises a microring-resonator (MR)-based crossbar switch.

15. The computing system of claim 11, wherein the wavelength-selective input switch and the wavelength-selective output switch are implemented using MR filters.

16. The computing system of claim 11, wherein each MR filter in the wavelength-selective input and output switches includes an integrated heater that can selectively turn the MR on or off by changing a temperature of the MR so that a resonance wavelength of the MR shifts beyond a free spectral range of all wavelengths in an associated link.

17. The computing system of claim 11, wherein the parameter L of the wavelength-selective input switch and the wavelength-selective output switch can be as large as N.

18. The computing system of claim 11, further comprising a set of event-driven, energy-efficient, high-speed transceivers (TRXs) with dynamic voltage and frequency scaling (DVFS) coupled to endpoints of the bandwidth-reconfigurable optical interconnect.

19. The computing system of claim 11, wherein the bandwidth-reconfigurable optical interconnect is a member of a set of bandwidth-reconfigurable optical interconnects, which are hierarchically connected in a tree topology to create a Hierarchical Flexible Low-latency Interconnect Optical Network (Hi-Flex-LION) switch, which facilitates communication among the set of computing nodes.

20. The computing system of claim 11, wherein the bandwidth-reconfigurable optical interconnect is a member of a set of bandwidth-reconfigurable optical interconnects, which are connected in a thin-Clos topology to create a thin-Clos Flex-LION switch, which facilitates communication among the set of computing nodes.

21. A method for operating a bandwidth-reconfigurable optical interconnect, comprising:
  receiving N optical interconnect inputs;
  using a wavelength-selective input switch to selectively direct up to L wavelengths from each of the N optical interconnect inputs into a corresponding input of a wavelength-insensitive switch, which provides all-wavelength, all-to-all connectivity between N wavelength-insensitive inputs and N wavelength-insensitive outputs;
  passing unselected wavelengths from each of the N optical interconnect inputs into a corresponding input of an arrayed waveguide grating router (AWGR), which provides cyclic, single-wavelength, all-to-all routing between N AWGR inputs and N AWGR outputs;
  using a wavelength-selective output switch to selectively direct up to L wavelengths from each of the N wavelength-insensitive outputs into a corresponding optical interconnect output in a set of N optical interconnect outputs; and
  passing each of the N AWGR outputs into a corresponding optical interconnect output in the set of N optical interconnect outputs.

* * * * *